US012759195B2

(12) United States Patent
Storey et al.

(10) Patent No.: US 12,759,195 B2
(45) Date of Patent: Oct. 13, 2026

(54) THERMOFORMING APPARATUS AND PROCESS

(71) Applicant: GEORGE TFE SCP, Monaco (MC)

(72) Inventors: Piers Christian Storey, Nice (FR); John George Lloyd, Monaco (MC); Farbod Nosrat Nezami, Stuttgart (DE); Frieder Fink, Lenningen (DE)

(73) Assignee: GEORGE TFE SCP, Monaco (MC)

( * ) Notice: Subject to any disclaimer, the term of this patent is extended or adjusted under 35 U.S.C. 154(b) by 238 days.

(21) Appl. No.: 17/917,967

(22) PCT Filed: Apr. 23, 2021

(86) PCT No.: PCT/IB2021/053359
§ 371 (c)(1),
(2) Date: Oct. 10, 2022

(87) PCT Pub. No.: WO2021/214721
PCT Pub. Date: Oct. 28, 2021

(65) Prior Publication Data

US 2023/0129106 A1 Apr. 27, 2023

(30) Foreign Application Priority Data

Apr. 24, 2020 (EP) .................................... 20020196

(51) Int. Cl.
*B29C 33/04* (2006.01)
*B29C 51/08* (2006.01)
(Continued)

(52) U.S. Cl.
CPC .......... *B29C 33/046* (2013.01); *B29C 51/085* (2013.01); *B29C 51/264* (2013.01);
(Continued)

(58) Field of Classification Search
None
See application file for complete search history.

(56) References Cited

U.S. PATENT DOCUMENTS 3,619,444 A 11/1971 Roth
4,469,655 A 9/1984 Kiss
4,822,436 A * 4/1989 Callis ................. B29C 43/3642
264/571
(Continued)

FOREIGN PATENT DOCUMENTS

DE 10359563 A1 7/2005
DE 10 2013 019806 A1 5/2015
(Continued)

*Primary Examiner* — Thu Khanh T. Nguyen
(74) *Attorney, Agent, or Firm* — Jason L DeFrancesco

(57) ABSTRACT

Thermoforming apparatus (1) for thermoforming an article (2), preferably a permeable article (2'), comprising: an elastic membrane (3,3'); a mould (4,4'); a hot air source (5) configured to blow a hot airflow (6) towards a zone (7) of the apparatus (1) configured to receive the article (2,2') to be thermoformed; an actuation system (8) configured to move the mould (4,4') towards the membrane (3,3') or vice versa to compress the heated article (2,2') between the membrane (3,3') and the mould (4) such that an elastic force of the membrane (3,3') on the article (2,2') forces the article (2,2') to assume the shape of the mould (4).2. Thermoforming apparatus (1) according to claim 1, wherein the mould (4') and/or membrane (3') are perforated so to permit a transit of the hot airflow (6) from the hot air source (5) to said zone (7). Thermoforming process of an article (2,2') in a thermoforming apparatus (1) comprising an elastic membrane (3,3'), a mould (4,4') and a hot air source (5), comprising the steps of: heating the article (2,2') through a hot airflow (6) blew by the hot air source (5); compressing the heated article (2,2') between the membrane (3,3') and/or the mould (4,4') by uniquely moving the mould (4,4') and the membrane
(Continued)

(3,3') one toward the other such that an elastic force of the membrane (3,3') forces the article (2,2') to assume the shape of the mould (4,4').

21 Claims, 3 Drawing Sheets

(51) Int. Cl.
*B29C 51/26* (2006.01)
*B29C 51/42* (2006.01)

(52) U.S. Cl.
CPC .... *B29C 51/421* (2013.01); *B29C 2793/0027* (2013.01); *B29C 2793/0081* (2013.01)

(56) References Cited

U.S. PATENT DOCUMENTS

| | | | | |
|---|---|---|---|---|
| 4,938,678 | A * | 7/1990 | Oulman | B29C 51/262 269/239 |
| 6,146,578 | A | 11/2000 | Van Ert | |
| 6,257,866 | B1 * | 7/2001 | Fritz | B29C 51/10 425/388 |
| 6,537,483 | B1 * | 3/2003 | Cartwright | B29C 35/041 264/516 |
| 2008/0251969 | A1 | 10/2008 | Isham | |
| 2013/0099429 | A1 * | 4/2013 | Filsinger | B29C 70/548 425/129.1 |
| 2014/0001682 | A1 * | 1/2014 | Schneiderbauer | B29C 70/443 264/571 |
| 2014/0239556 | A1 * | 8/2014 | Fisher | B29C 51/46 425/388 |

FOREIGN PATENT DOCUMENTS

| | | | |
|---|---|---|---|
| EP | 2511080 | A1 | 10/2012 |
| JP | H11 131397 | A | 5/1999 |
| WO | 2019081062 | A2 | 5/2019 |

* cited by examiner

THERMOFORMING APPARATUS AND PROCESS

TECHNICAL FIELD

The present invention relates to forming apparatuses and processes. In particular, it relates to thermoforming apparatuses and processes. Even more particularly, it relates to thermoforming apparatuses and processes using an elastic membrane, preferably a membrane permeable to air.

BACKGROUND ART

Notoriously, the forming or thermoforming processes comprise two main steps: firstly the article to be formed is heated and secondly the heated article is formed. Consequently, forming and thermoforming apparatuses are configured to implement these two macro-steps. In the state of the art various vacuum forming processes and apparatuses are known. An example in this sense is provided by the document DE10359563 disclosing an apparatus wherein a sheet-like semi-finished product is firstly pre-stretched by a die and subsequently formed through vacuum into a female mould.

In the state of the art are also known various positive pressure forming processes and apparatuses. An example in this sense is provided by the document WO2019081062 disclosing an apparatus wherein a plastic film is firstly pre-stretched by a die and subsequently is formed through an overpressure which pushes the semi-finished product against a female mould. Another example in this sense is disclosed in the document U.S. Pat. No. 4,469,655

In the state of the art are also known various apparatuses which combine a positive pressure with vacuum forming systems. An example in this sense is provided by the document U.S. Pat. No. 3,619,444 which discloses an apparatus wherein a continuous polystyrene sheet is contemporary exposed to a vacuum depression, attracting the product against a female mould, and a positive pressure, forcing the product to adhere to said female mould.

An apparatus for forming a semi-finished composite material is known from the document DE102013019806, wherein this semi-finished material is arranged between two elastic silicone membranes to prevent wrinkling of composite fibres. Subsequently, a positive pressure is provided so to push the membranes and the semi-finished product against a female mould.

Solutions wherein the semi-finished product is pushed, by an overpressure, or attracted, by a depression, against a mould are thus known.

In the state of the art are also known solutions for forming semi-finished products through an elastic membrane attracted by depression against a positive mould. An example in this sense is provided by the document EP2511080, wherein a depression attracts a membrane toward a positive mould, so apply a compacting force against a semi-finished composite material for shaping it.

All the solutions available in the state of the art, including or not a membrane, require to pressurize or depressurize a volume of a moulding machine, for applying a force on the semi-finished product and pushing it against a positive or negative mould. This implies that such apparatuses need robust sealing systems both in case of pressurization and depressurization.

Another example is disclosed in the document U.S. Pat. No. 6,146,578. This document describes a thermoforming apparatus wherein two halves move one towards the other for press an article to be thermoformed. These halves comprise a flexible portion for allowing a closure of the mould.

Furthermore, the large part of the available solutions require two moulds, a positive mould and a negative mould, which implies higher costs and mechanical difficulties, like the perfect aligned of moulds.

Moreover, the known thermoforming machines are conceived for working plastic sheets or films that are firstly blocked with respect to the mould, secondly formed and thirdly cut, so to obtain the final product. Since said sheet must be peripherally anchored during forming, a margin must be considered for permitting to the apparatus to grip the sheet. Since this margin represents a production waste, a large amount of shrinkage is generated, and the finished product costs more.

In particular this drawbacks occurs when the semi-finished product to be thermoformed is expensive.

Also, only few known apparatuses permit to obtain a 3D finished product directly from a 2D semi-finished product without intermediate pre-forming steps. This preliminary step elongates the production time and consequently reduces the manufacturing capacity.

Finally, the known apparatuses are conceived for forming thin articles and not thick permeable articles. If a thick permeable article is formed in a traditional machine, a very long setting phase must be expected and a wide number of defective products can result, because of non-uniform heating of the article before the forming phase.

Furthermore, the known thermoforming apparatuses heat the article to be formed from one side through infrared heating systems. This kind of heating systems overheats the side of the article exposed to the radiations, keeping cooler the opposite side. As a consequence, said non-uniform heating of the article is even accentuated. Concluding, none of the known solutions permits to form an article that is simply arranged in the forming machine, without being anchored to it.

None of the solutions available in the state of art solves contemporary all, or substantially all, the above cited problems.

SUMMARY

Said inconvenients of the state of the art are now solved by a thermoforming apparatus for thermoforming an article, which represents a first scope of this invention. Said apparatus comprising: at least an elastic membrane; at least a mould; a hot air source configured to blow a hot airflow towards a zone of the apparatus configured to receive the article to be thermoformed can be arranged; an actuation system configured to move the mould towards the membrane or vice versa so to compress the heated article between the membrane and the mould such that an elastic force of the membrane on the article forces the article to assume the shape of the mould. Preferably said article is a permeable article. Said actuation system actuates the mould, the membrane, or both of them, without inflating or deflating the membrane. Uniquely a relative movement of the mould and membrane allows to compress the article. This relative movement is performed by means of the actuation system. This apparatus permits to avoid pressurization/depressurization systems, which imply higher costs and long production time. Furthermore, this solution permits to form an article without anchoring it to the apparatus, therefore more easily and quickly. Furthermore, this apparatus allows to form an article free of defects.

Advantageously the mould and/or membrane can be perforated so to permit a passage of the hot airflow from the hot air source to said zone. This solution permits faster heating of permeable articles and consequently a shorter overall thermoforming cycle.

Said zone is a portion of the elastic membrane or of the mould configured to receive the article so that the article is held between the mould and the elastic membrane. This arrangement of the article is simplified and allows to not anchor the article to the apparatus, avoiding waste of material.

Preferably, the hot airflow is an airflow having a predetermined temperature, preferably said predetermined temperature is equal or slightly greater than the temperature at which the article becomes pliable. This solution permits to avoid excessive overheating of the article, thus reducing the shrinking of the article.

Advantageously, the hot air source comprises a heater and a blower. The hot airflow generated by the hot air source touches or crosses the article permitting to heat it more uniformly and faster.

Preferably, the mould is at least partially a positive mould. This solution is particularly suited to obtain curved articles. Positive mould means that mould has a convex shape, thus it is, at least in part, curved outwards.

Particularly, the hot air source can be arranged below the mould and the membrane. This arrangement permits to flow hot air bottom-up and to have a mould that is lowered from above.

Advantageously, the apparatus can further comprise an air duct for delivering the hot airflow from the hot air source to said zone. This feature enables the hot air source to be arranged beside the moulding area, reducing the overall footprint of the apparatus. Preferably the air duct comprises a diffusor configured to spread the hot airflow across the air duct. In this way, the hot airflow is uniformly distributed over the entire forming zone. An alternative diffusor can be shaped so to concentrate the hot airflow towards specific areas of the article, for facilitating the bending of these areas during forming.

Preferably, the thermoforming apparatus can comprise a cooling system. This cooling system can comprise one or more of the following options: a mould-cooling circuit; one or more nozzles configured to blow cold air towards said zone; a mechanism configured to deflect away the hot airflow from said zone; a room temperature blower. This cooling system sets the shape of the formed article and prevents distortion of the article after the forming.

The thermoforming apparatus can also comprise a temperature probe and a control unit configured to control the hot air source so that the hot airflow temperature is regulated according to a temperature measured by the temperature probe. This characteristic enables a precise control of the forming conditions for avoiding defects on the formed article.

Advantageously, the thermoforming apparatus can comprise a recirculation system for circulating back to the hot air source the hot airflow blown over said zone. In this way, the energy consumed by the apparatus is reduced.

Said actuation system can comprise an actuator. This actuator can be controlled according to one or more of the following parameters: force, speed, movement depth. By controlling these parameters of the actuator, the apparatus can be adapted to different types of article to be thermoformed.

The thermoforming apparatus can also comprise a further elastic membrane arranged so that the article lies between the further elastic membrane and the other membrane. Preferably this further elastic membrane comprises a plurality of passing-through holes. A further elastic membrane allows to clamp the article during forming. This further membrane can also have a surface finishing with a different roughness with respect to the other elastic membrane so to facilitate the curvature of the article during forming.

Preferably the apparatus also comprises a reference system for determining the right position of said zone wherein the article can be arranged. Said reference system can comprise a laser projector. Preferably said membrane can comprise one or more of the following reference systems: a physical ridge; an indentation; a cut; a protrusion. In this way, the article can easily be arranged in the correct place by an operator and the forming is facilitated.

Advantageously, the apparatus can also comprise a tensioner configured to stretch the elastic membrane. Preferably the tensioner holds the elastic membrane along its perimeter. The tensioner keeps the elastic membrane tight providing a pre-tensioning of the membrane which helps to generate a strong elastic force on the article during the forming.

In particular, a relative displacement between the membrane and the mould can be such that a moulding surface of the mould crosses the tensioner. Preferably the moulding surface goes beyond the tensioner, thus the moulding surface overcomes the tensioner quote/position. In this way, the right elastic force of the membrane on the article is achieved.

In particular, the mould can be a single mould. In this case, this single mould is the only mould of the thermoforming apparatus. Having a single mould, the formed article can be removed from the apparatus more easily and formed faster.

Alternatively, if the article comprises concave and convex portions, the apparatus further comprises a counter-mould, arranged opposite to the main mould with respect to the zone and the membrane. Preferably, the counter-mould covers only a portion of the main mould if the apparatus is observed from an axis of the mould.

Advantageously, the elastic membrane can be entirely made of silicone or an elastomer in order to be completely flexible. Preferably, this material can have a shore A grade comprised between 25 and 75, more preferably having a tear elongation higher than 400%. These values allow to achieve an optimal elasticity of the elastic membrane.

A second scope of present invention is a thermoforming process of an article in thermoforming apparatus comprising an elastic membrane, a mould and a hot air source, comprising the steps of: heating the article through a hot airflow blew by the hot air source; compressing the heated article between the membrane and the mould by uniquely moving the mould and the membrane one toward the other such that an elastic force of the membrane forces the article to assume the shape of the mould. This method permits to form articles, preferably permeable articles, quickly and cheaply, without using a system of depressurization or over pressurization.

Advantageously, the process comprises the step of cutting the article uniquely before heating and pressing it. In this way, the formed article is ready to be used without further finishing steps.

These and other advantages will be better understood thanks to the following description of different embodiments of said invention given as non-limitative examples thereof, making reference to the annexed drawings.

DRAWINGS DESCRIPTION

DETAILED DESCRIPTION

Figure 1A:
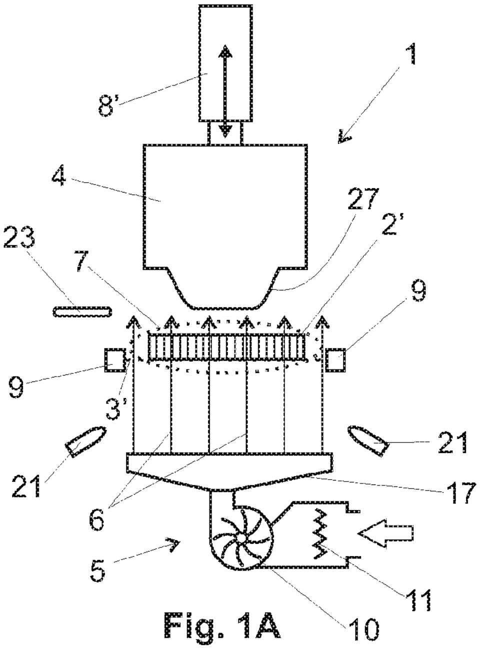
FIGS. 1A and 1B show a schematic view of a first embodiment of the apparatus according to the present invention, respectively in the rest and operating conditions.

The following description of one or more embodiments of the invention is referred to the annexed drawings. The same reference numbers indicate equal or similar parts. The object of the protection is defined by the annexed claims. Technical details, structures or characteristics of the solutions herebelow described can be combined with each other in any suitable way.

In the present description, the term "permeable" means that a gas can pass through it. Consequently, a "permeable article" means an article comprising a plurality of channels or cells arranged and shaped so that air can pass through them from one side to another side of the article.

With reference to the FIG. 1-5, an apparatus 1 for thermoforming an article 2 is schematically represented in various embodiments which can be combined in order to provide further embodiments not represented in the annexed drawings.

The article 2 is preferably made of a plastic or polymeric material, preferably a thermoplastic material, like polycarbonate or polypropylene.

The article 2 can be a permeable article 2', as represented in the embodiments of FIGS. 1, 2 and 5, or not permeable, as represented in the embodiments of FIGS. 3 and 4. As already explained, the permeable article 2' is an article which permits the transit of air.

The article 2' is permeable and is flat. A part from its thickness, this article 2' can be considered 2D, so bidimensional.

The article 2' is permeable because it comprises a plurality of open cells arranged side by side. An example of this kind of article is commercially known with the name of Koroyd®, and the document EP1694152B1 describes it in detail. This document is herein incorporated by reference for the specific architecture of the array of energy absorbing cells. This known article is particularly indicated for this thermoforming apparatus and process, because this honeycomb cellular structure comprises open cells. Another example of a similar permeable article is described in the document US20160353825, which comprises a plurality of interconnected cells. This sheet substantially corresponds to the article commercially known with the name of Wavecel™. These kind of articles are objects having a high strength-to-weight ratio. Other types of permeable articles suitable to be used with this apparatus or process are rigid open cells foams, 3D lattice structures, or spherical cellular materials. Alternatively, the article can a honeycomb cellular structure, like a Nomex™ honeycomb or an aluminium honeycomb.

The mould 4 is in part positive, thus convex, and in part neutral, thus substantially flat, as represented in the embodiments of FIG. 1-4, but it can be also in part negative, as represented in FIG. 5. In the latter case, in addition to the membrane a counter-mould 28 is required as described in details later on.

The mould 4 can be a perforated mould 4', thus comprising passing through holes for permitting the transit of air through it, as represented in the embodiment of FIG. 2.

The mould 4,4' is rigid and made of metal as normally occurs in the thermoforming technological field, but it can also be made of epoxy resin, wood or polymer depending on the material of the article and consequently on the operating temperatures.

The term "membrane" means a thin sheet that can be easily moulded or bent. The term "elastic membrane" means a membrane made of an elastic material so completely elastic.

The elastic membrane can be an elastic perforated membrane 3', as represented in the embodiments of FIGS. 1 and 5, or not, as represented in the embodiments of FIGS. 2, 3 and 4. The term "perforated" means that a plurality of passing through holes cross the thickness of the membrane sheet.

The elastic membrane 3,3' can be made of silicone or elastomer, preferably having a shore A grade comprised between 25 and 75. Preferably, the elastic membrane has a tear elongation higher than 400%, more preferably higher than 600%. Heat resistant elastomers like TDBN, TPIN or EPDM are preferable for realizing said membrane. Alternatively, the perforated membrane can be a mesh or a woven made with elastic yarns.

Figure 2A:
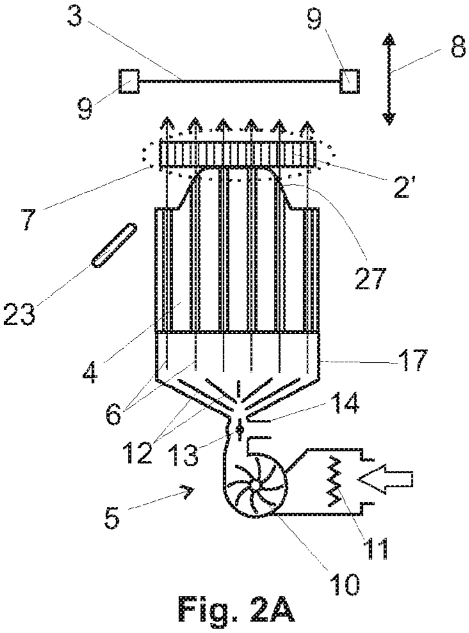
FIGS. 2A and 2B show a schematic view of a second embodiment of the apparatus according to the present invention, respectively in the rest and operating conditions.
Figure 3A:
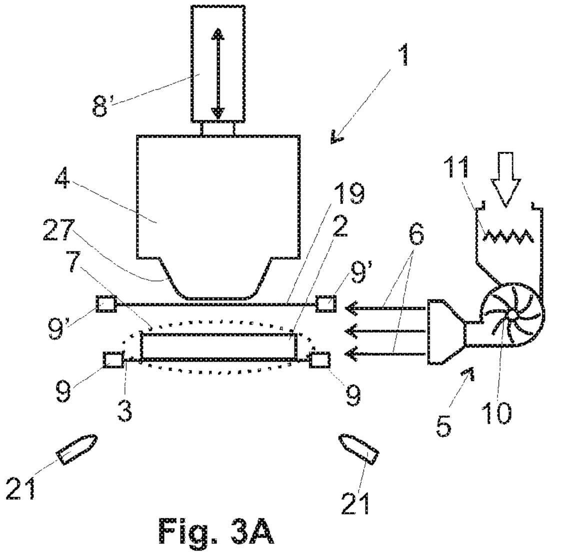
FIGS. 3A and 3B show a schematic view of a third embodiment of the apparatus according to the present invention, respectively in the rest and operating conditions.
Figure 4A:
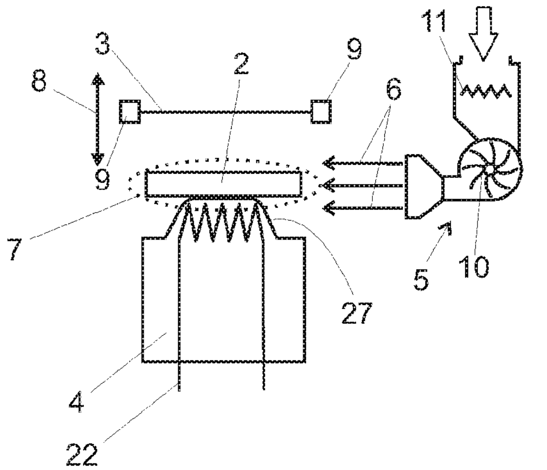
FIGS. 4A and 4B show a schematic view of a fourth embodiment of the apparatus according to the present invention, respectively in the rest and operating conditions.
Figure 5A:
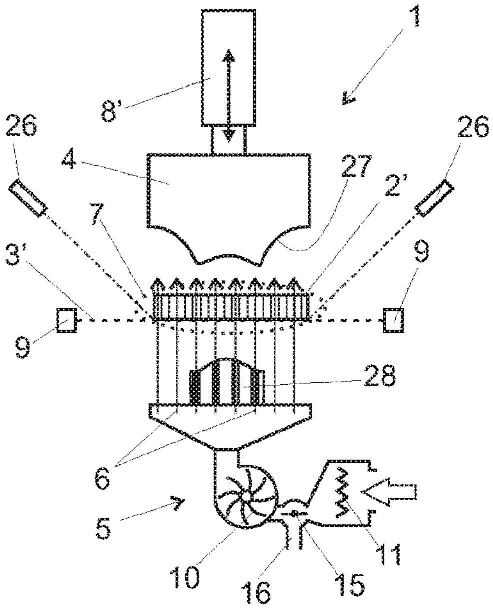
FIGS. 5A and 5B show a schematic view of a fifth embodiment of the apparatus according to the present invention, respectively in the rest and operating conditions.
Figure 6:
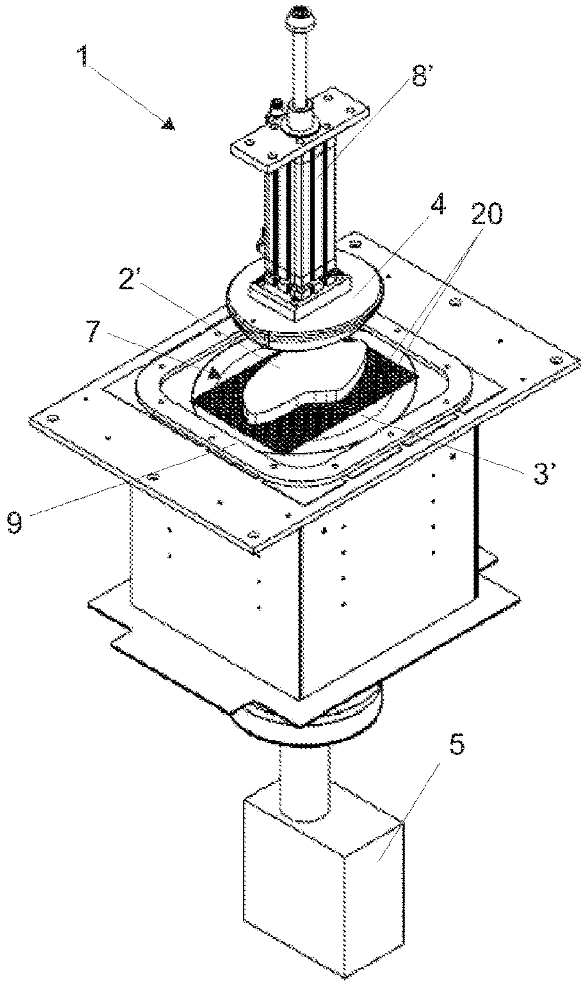
FIG. 6 shows an axonometric view of an apparatus according to the present invention.

The article 2,2' is placed on the zone 7. This zone 7 can be defined on the membrane 3', as shown in the embodiments of FIGS. 1A, 3A and 5A, or on the mould 4,4', as shown in the embodiments of FIGS. 2A and 4A. This zone 7 is the area wherein the forming occurs. In case of a perforated membrane 3', the zone 7 of the membrane 3' substantially corresponds to the area wherein the holes 20 are present, as represented in FIG. 6. The zone 7 is arranged between the mould 4,4' and the membrane 3,3'.

The mould 4 is moved up and down by means of an actuation system 8, as represented in the embodiments of FIGS. 1, 3 and 5. In these embodiments the mould 4 descends over the article 2,2' deforming the membrane 3,3'.

Figure 7:
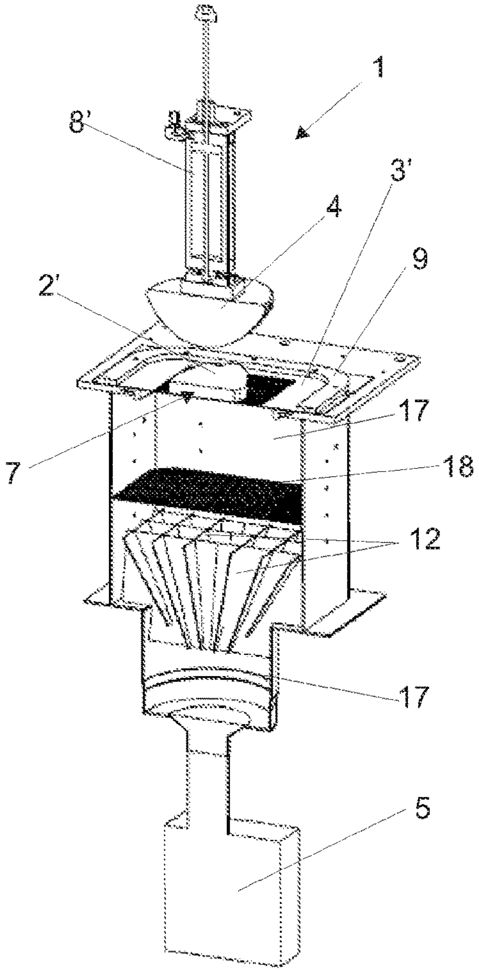
FIG. 7 is an axonometric cross-sectional view of the apparatus of FIG. 6.

Alternatively, the mould 4,4' remains still, as represented in the embodiments of FIGS. 2 and 4, and the membrane 3,3' descends over the article 2,2' and consequently over the mould 4,4'. In this case, the tensioner 9 is lowered towards the mould 4,4' and consequently also the membrane 3,3' descends. The tensioner 9 can be a frame which holds the elastic membrane 3,3' as represented in FIGS. 6 and 7.

The actuation system 8 can include an actuator 8', as represented in the embodiments of FIGS. 1, 3 and 5, that can be pneumatic, hydraulic, mechanic or electromechanic.

This actuator 8' is controlled according to one or more of following parameters: force, speed, displacement or actuation time.

Depending on the article to be formed, the speed can be adapted. In general the speed of the mould is not so quick because otherwise the article 2,2' is hit and eventual lateral displacements of the article 2,2' can occur.

The displacement can be regulated to control the depth of the mould's movement with respect to the membrane 3,3' frame. The displacement of the mould determines the elastic reactive force generated by the membrane 3,3' on the article 2,2' and on the mould 4. This elastic reaction of the membrane 3,3' generates a pressure over the article 2,2' and consequently an opposite pressure of the mould 4,4' over the opposite side of the article 2,2'.

Normally, the displacement amount is used to determine the magnitude of this double pressure over the article 2,2', but if the actuator is of the pneumatic type, the displacement can be regulated by the pressure into the pneumatic cylinder of the actuator 8'. Increasing the inner pressure of the pneumatic cylinder, the displacement of the mould is increased and the force exerted by the mould 4,4' over the article 2,2' is accordingly increased.

In a particular version of the apparatus, the displacement of the actuator is a function of a reaction force measured on the mould itself and the thermoforming is completed only when a certain reaction force is measured between the article and the mould. In this case the mould can be equipped with at least one strength/pressure sensor.

Another parameter of the actuator 8' can be the actuation timing, thus how long the mould 4,4' is kept in contact against the article 2,2'.

The above-mentioned embodiments relates to a mould actuated by an actuator 8', but even the membrane 3,3' can be actuated over a static mould in the same way. The actuation system of the membrane 3,3' of the embodiments of FIGS. 2 and 4, can work as above described and can be regulated according to the same parameters.

The apparatus 1 also comprises a hot air source 5 which draws in air and outputs a hot airflow 6. The hot air source 5 comprises a heater 11 and a blower 10 as represented in FIG. 1-5. This hot air source 5 is arranged below the membrane 3' and the mould 4,4', and consequently below the article 2'.

Figure 2B:
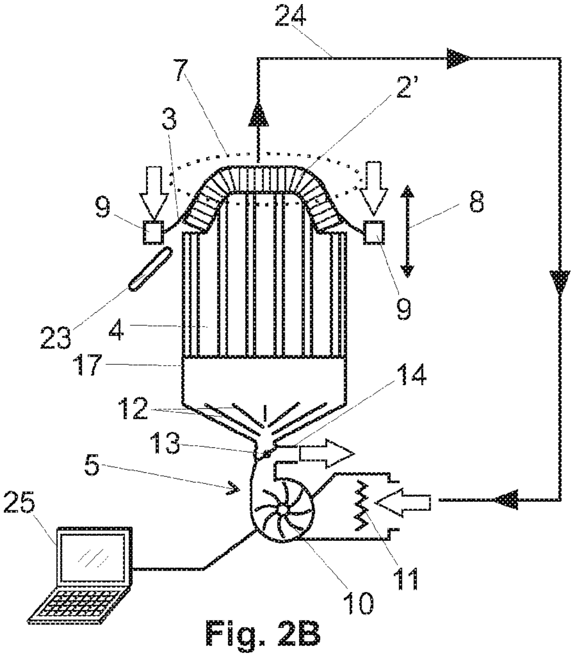

As represented in FIG. 2B the air drawn in by hot air source 5 can be air recirculated from the zone 7 wherein the forming occurs, this solution can be applied also to the other embodiments. The heater 5 can comprise a heat exchanger (not shown) wherein a hot fluid flows or can comprise an electric resistance crossed by the airflow drawn in by the blower 10. The blower 10 can comprise an electric fan for flowing the air heated by the heater 11.

This hot airflow 6 generated by the hot air source 5 is directed towards the zone 7 wherein the article 2,2' is arranged. The hot airflow 6 can pass through the elastic perforated membrane 3', as represented in the embodiment of FIGS. 1 and 5 or through the mould 5, as represented in the embodiment of FIG. 2. These solutions are preferred in case of a permeable article 2', in particular if the article 2' comprises open cells or channels vertically oriented as represented in FIGS. 1, 2 and 5. Since the article 2' is permeable, a large quantity of hot air 6 touches the cells of article 2', heating it quickly and uniformly. Traditional ovens used in forming processes are limited, because they heat the article externally and rely on conduction to facilitate a heat transfer across the material's thickness. In this way, a higher temperature is required for heating the whole thickness of the article, and possible defects during forming can occur. On the contrary, with the present apparatus 1, since the permeable article 2' is heated uniformly, when the mould 4,4' and membrane 3,3' move one towards the other, the permeable article 2' reaches the correct temperature evenly throughout and can be easily and effectively formed.

For delivering the hot airflow 6 from the hot air source 5 to the zone 7, the apparatus can comprise an air duct 17. This air duct 17 allows to arrange the hot air source 5 below the membrane 3,3' or the mould 4,4'. The air duct 17 comprises a portion for spreading the hot airflow 6 over the entire zone 7.

In order to maximize this effect, the air duct 17 can comprise a diffusor 12, as represented in the embodiment of FIG. 2. The diffusor 12 can be used in all other embodiments.

The embodiment of FIG. 7 represents a specific type of diffusor 12 that can be used. In a particular embodiment (not shown), the fins of the diffusor 12 can be arranged so to concentrate the hot airflow in specific areas of the zone 7, for heating more certain portions of the article 2,2' and facilitating its bending in these portions.

The elastic membrane 3,3' is connected and tensioned by a tensioner 9 along its periphery (schematically represented in FIG. 1-5). The tensioner 9 is used to provide a pre-tensioning to the elastic membrane 3,3'.

The tensioner 9 can be a frame that blocks the elastic membrane along its periphery as represented in FIG. 6.

The tensioner 9 also works as a reference for the mould-membrane movement.

The tensioner 9 can also include a plurality of preloaded springs providing a pre-tensioning to the membrane 3,3'. These springs can be anchored to the perimeter of the membrane 3,3'. Alternatively, the tensioner 9 can be active, thus configured to change the tension of the membrane 3,3' when the article 2,2' is pushed against the mould 4,4' and the membrane 3,3', so to vary the reactive elastic force of the latter.

In order to thermoform the article 2,2', the following process is implemented. The hot airflow 6 firstly flows towards the zone 7 wherein the article 2,2' is arranged. The zone 7, as already described, is arranged between the elastic membrane 3,3' and the mould 4,4'. Secondly, the membrane 3,3' is tensioned uniquely by moving the mould 4,4' and the membrane 3,3' one toward the other so to compress the article 2,2' between them.

In the embodiments of FIGS. 1, 3 and 5, the mould 4 descends below the height of the elastic membrane 3,3', thus below the height of tensioner 9. In this way, the elastic membrane 3,3' is deformed and the article 2,2' remains compressed between the mould 4 and the membrane 3,3'.

Since the article 2,2' has been previously heated, once it is compressed between the mould 4 and the membrane 3,3', the elastic force of the membrane 3,3' forces the article 2,2' to assume the shape of the mould 4.

The elasticity of the membrane 3,3' allows to progressively follow the deformation of the heated article 2,2' and to contemporary push the article 2,2' against the mould 4. On the other side of the article 2,2', the mould 4 remains still or pushes further to ease the deformation of the article 2,2' according to the mould 4,4' shape.

For creating the right elastic reaction of the membrane 3,3', the mould 4 needs to descend as much as possible below the tensioner 9 quote, as represented in FIGS. 1, 3 and 5. Alternatively, the elastic membrane 3,3', together with its tensioner 9, descends over the mould 4,4' until the moulding surface 27 of mould 4,4' completely, or almost completely, penetrates the elastic membrane 3,3', as represented in FIGS. 2 and 4.

The moulding surface 27 goes down lower the tensioner 9 in order to stretch more the membrane 3,3' and having a greater elastic force on the article 2,2'.

Optionally, the process can comprise a preliminary step including the pre-cutting of the article 2,2'. Since the article 2,2' is initially flat, cutting it before the thermoforming phase can be easier. Consequently, the process includes the preliminary step of cutting the article uniquely before forming it. Uniquely means that further cutting steps are not required afterforming step, thus once the article 2,2' is shaped. In this way no material of the article 2,2' is wasted after thermoforming and the article can be immediately used after forming. For example, when the article is an energy absorbing pad as represented in FIGS. 6 and 7, this pad is preliminary cut when the pad is flat, so that, after forming, it can be directly inserted in a helmet, without further finishing steps. In this way, a minimum amount of material is consumed and the overall shaping process of the pad is simplified.

Figure 1B:
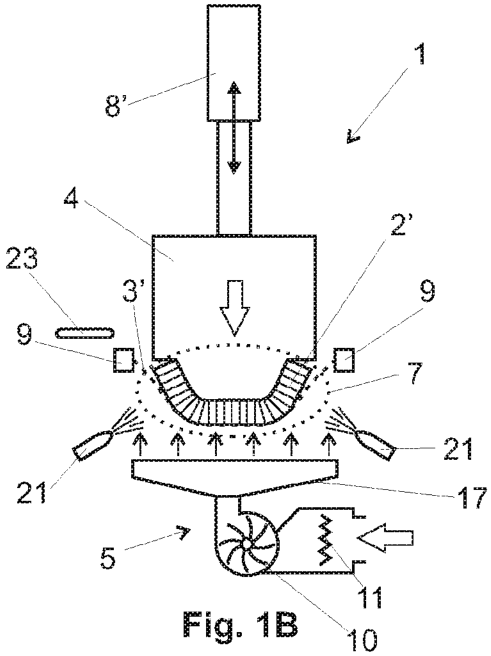
Figure 3B:
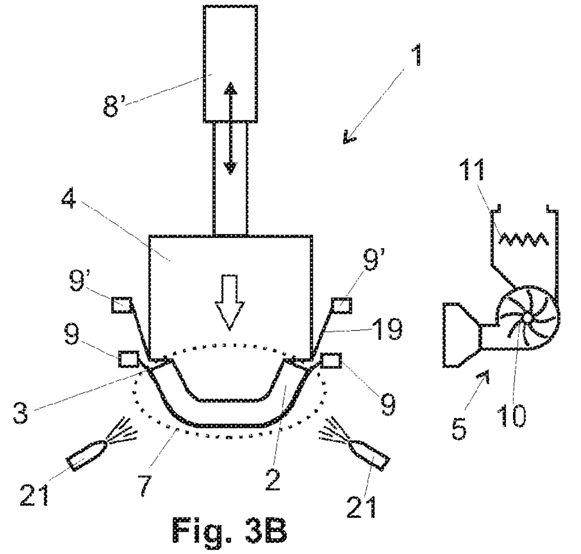

The apparatus 1 can comprise at least one cooling system in order to cool and consequently set the formed article 2,2'. In particular, once the mould 4,4' crosses the membrane 3,3', the hot airflow 6 can be interrupted, as shown in the embodiments of FIGS. 3B, 4B and 5B, or deviated, as shown in the embodiment of FIG. 2B, or simply reduced, as shown in the embodiment of FIG. 1B.

Figure 4B:
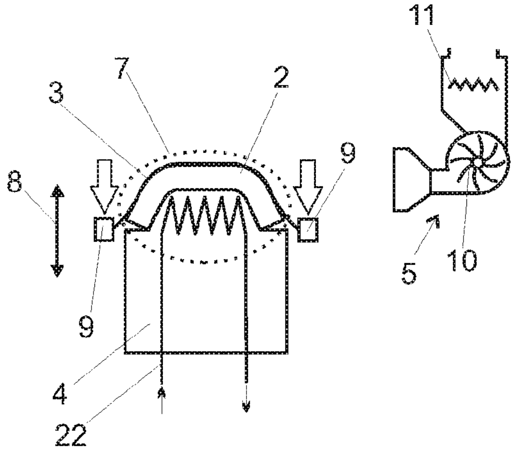
Figure 5B:
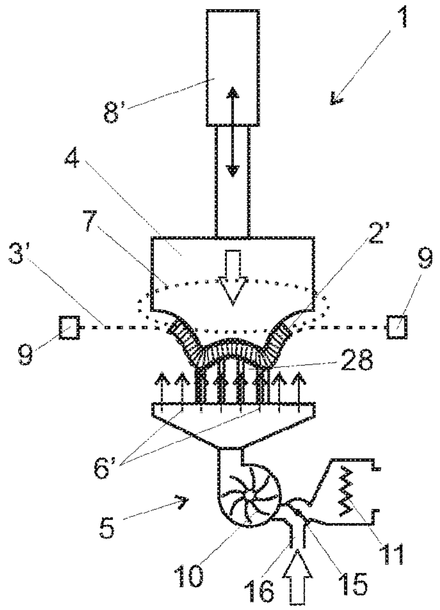

To further cool down the article 2,2' and consequently freeze its deformed shape quicker, the article 2,2' can be cooled down via nozzles 21, which flow fresh air against the article 2,2' and the membrane 3,3', as shown in the embodiments 1B and 3B, or deviating the hot airflow 6 away, as shown in the embodiment of FIG. 2B, or cooling the mould with a specific mould-cooling circuit 22, as shown in FIG. 4B, or blowing room temperature air with the blower 10, as shown in the embodiment of FIG. 5B.

In case of one or more nozzles 21, they point towards the zone 7 wherein the article 2,2' is arranged, and they flow an intense flow of cold air or room temperature air.

For deviating the hot airflow 6 away, a first valve 13 and a discharge outlet 14 arranged along the air duct 17 can be used. When the first valve 13 is opened, the hot airflow 6 is free to flow towards the zone 7, vice versa, when the first valve 13 is closed, the hot airflow 6 is deviated externally to the apparatus 1 through the discharge outlet 14. Alternatively, the hot airflow 6 discharged via the outlet 16 is recirculated towards the hot air source inlet.

In case of a mould-cooling circuit 22 arranged in the mould 4, a refrigerant flows in the mould, close to its moulding surface 27, so to reduce drastically and quickly the mould temperature, which becomes hot during the heating phase. Alternatively, the mould temperature is maintained constant during the whole process, for example at a temperature that is lower than the heat deflection temperature of the article material, for simplifying the process from a control point of view.

The article 2,2' can be also cooled down using the blower 10 to flow room temperature or cold air. In this case, upstream to the blower 10 is arranged a second valve 15 and an auxiliary inlet 16, which permits to draw and blow not-heated air by means of the blower 10.

One or more of these cooling systems can be combined, if compatible, to improve the cooling effect.

In order to monitor the temperature of the zone 7, wherein the article 2' is arranged, one or more temperature probes 23 are foreseen. In this way, the forming temperature is constantly monitored and the mould 4 can be acted only when the desired temperature is achieved.

Specifically, the desired temperature is greater than the heat deflection temperature (HDT) of the article material, to allow its plastic deformation. The HDT is defined as the temperature at which a standard test bar of a specific material deflects a specified distance under a load. According to the present invention, the heat deflection temperature of a specific article's material is measured according to ISO 75 and ASTM D648 rules.

If the article 2,2' is made by more than one materials, like the above-mentioned Koroyd® article, said predetermined temperature is a temperature that is higher than the deflection temperature of the hardest material and lower than the decomposition temperature of the softer material, wherein "hardest" means the material more resistant to temperature and "softer" means the opposite one. Koroyd® pad is made of a plurality of interconnected cells, each one comprising an outer tube and an inner tube, wherein the outer tube has a deflection temperature that is lower than that of inner tube. Another factor that influences the predetermined value of temperature is the overall geometry of the article 2,2'. If the article is permeable and its full portions are thin, said predetermined temperature is slightly higher than the deflection temperature of the material, or of the hardest material as in the Koroyd® case. Indeed, if the thickness of the full portions of the permeable article 2' is small, the hot airflow quickly heats them and high values of temperature are not required. The term "slightly higher" means between 1 to 5 Celsius degree higher than said deflection temperature.

A further factor that influences the thermoforming behaviour is the heating timing. If a predetermined temperature that is slightly higher than the deflection temperature is maintained fora long time, all full body portions are uniformly heated, but the thermoforming process becomes too long. Consequently, said predetermined temperature is increased as a function of the thickness of the full body portions. In the extreme case of a not permeable article 2, said predetermined temperature is higher. For all above-mentioned reasons, the predetermined temperature is a function of one or more of the following factors: the deflection temperature of the harder material of the article 2,2', the decomposition or melting temperature of the softer material of the article 2,2', the geometry of full body portion/s of the article 2,2' and the thermoforming duration. For example, in case of a polycarbonate permeable article, the predetermined temperature is comprised between 135° C. and 145° C. and the heating via hot airflow takes between 30 and 60 seconds. The temperature probe 23 is arranged close to the zone 7. Even if the temperature probe 23 is not represented in all the embodiments of FIG. 1-7, it can be applied to them.

The temperature probe 23 can be connected to a control unit 25, which in turn controls the hot air source 5. In this way a control loop is actuated and the temperature in the zone 7 is regulated activating the hot air source 5 if the temperature probe 23 measures a discrepancy with respect to the desired predetermined temperature.

In order to warm up the zone 7 more quickly and consuming less energy, the apparatus 1 can comprise a recirculation system 24 which draws hot air from the zone 7 and send it back to the hot air source 5. This recirculation system 24 can be a conduit connecting these two parts of the apparatus 1. If the hot air source 5 draws warm/hot air, the energy consumed by the heater 11 is reduced. Even if the recirculation system 24 is illustrated only for the embodiment of FIG. 2, all the other embodiments can adopt this solution.

Optionally, a further elastic membrane 19 can be provided in the apparatus 1. This further elastic membrane 19 is arranged over the other elastic membrane 3,3', so that the article 2,2' lies between them. The further membrane 19 can be perforated or not. The further membrane 19 can be arranged so to contact the article 2,2' or not. The further membrane 19 can be arranged above or below the other elastic membrane 3,3'.

In the embodiment of FIG. 3, the further membrane 19 is arranged above the article 2 and descends on it when the mould 4 goes down. Even if the further membrane 19 is not represented in other embodiments, it can be adopted in all of them.

The further membrane 19 can have a superficial smoothness which is different from that of the elastic membrane 3,3'. This characteristic is useful to compensate for the deformation of the article 2,2' during forming.

For example, with reference to FIG. 3B, the lower portion of the article 2 is subject to a greater friction with the elastic membrane 3, because the deformation of the article 2 on this side is bigger, consequently, the superficial smoothness of the elastic membrane 3, at least on its upper side, needs to be higher to allow to the lower surface of the article 2 of sliding during the deformation. On the contrary, the friction between the further elastic membrane 19 and the article 2 is lower, because the relative movements are smaller, consequently the superficial smoothness can be lower, for maintaining the article 2 in position and avoiding lateral displacements during the moulding.

The further elastic membrane 19 is peripherally anchored to a second tensioner 9', similarly to the other elastic membrane 3. The second tensioner 9 can be fixed, as represented in FIG. 3, or movable up and down.

The further elastic membrane 19 can also have a different hardness or thickness with respect to the elastic membrane 3, for regulating the elastic reactive force applied on the article 2,2' during the descent of the mould 4,4'.

The apparatus 1 can also comprise a reference system for indicating on the mould 4,4' or on the elastic membrane 3,3', the right position where the article 2,2' has to be positioned. This reference system can be a line or a sign reproduced on the membrane/mould. This line can reproduce the shape of the article 2,2' before the forming, so when it's still flat. Otherwise, the reference system can comprise a laser projector 26, like that represented in FIG. 5A, which indicates through a laser beam, the position of the zone 7 wherein the article 2,2' needs to be placed for having a correct forming.

Alternatively, the membrane 3,3' can comprise a ridge, which provides a reference system for positioning the article and limiting its lateral displacements.

Optionally, the apparatus 1 can also comprise a counter-mould 28, as represented in the embodiment of FIG. 5. This counter-mould 28 is used to form particular convex and concave articles. In particular, when the main mould 4,4' comprises a moulding surface 27 that is, at least in part, negative, the elastic membrane 3,3' would be not sufficient to push the article against the mould 4,4' in that zone. For this reason, an opposite counter-mould 28 is provided, in order to help the elastic membrane 3, at least in this concave portion of the mould 4,4'.

Looking at FIG. 5B, the central portion of the mould 4 is concave and the elastic membrane 3' would not be capable to push the article 2' against this portion of the mould 4 because of its tensioning, for this reason, a counter-mould 28 pushes the membrane 3' and the article 2' to match with the mould 4. The counter-mould 28 does not cover entirely the mould 4,4', because it is necessary only in correspondence of the concave portion of the mould 4. In this way, the counter-mould 28 is smaller with respect to the mould 4 and consequently the apparatus 1 costs less. The counter-mould 28 can be perforated, as represented in FIG. 5, or not. The counter-mould 28 can be movable or not.

The thermoforming apparatus 1 can optionally comprise more moulds associated to respective elastic membranes 3,3', so to form contemporary a plurality of articles 2,2'. In this way the production capacity is improved and certain tools, like the hot airsource 5, can be used for more articles 2,2' contemporary. For example, in case of pneumatic actuators 8', a single compressor can be employed for all the actuators 8'.

With reference to FIGS. 6 and 7, a specific embodiment of the apparatus according to the present invention is provided. The apparatus of this embodiment substantially corresponds to the embodiment of FIG. 1. This apparatus has been realized in reality and has obtained extraordinary results in terms of rapidity, consistency and reliability of forming. This apparatus 1 comprises a pneumatic actuator 8' configured to move up and down the mould 4. The mould 4 is completely positive, thus completely convex. The permeable article 2' is a flat array of cells, like a honeycomb structure, and after the forming becomes an energy absorbing pad of a helmet. The permeable article 2' has been pre-cut in order to obtain, after the thermoforming, the finished item directly. The permeable article 2' is simply placed on the perforated elastic membrane 3', without any fixing means. The elastic membrane 3' comprises a plurality of passing through holes 20 in correspondence of the zone 7 wherein the article 2' is arranged. The elastic membrane 3' is anchored to the apparatus body through a tensioner 9, that is a frame fixed to a plane of the apparatus 1. This body of the apparatus 1 is connected to the actuator 8' through arms (not shown). The body of the apparatus 1 is in part constituted by the air duct 17, which connects the hot air source 5 to the zone 7. Into the air duct 17 is arranged a diffusor 12, that spreads across the air duct 17 the hot airflow. Above the diffusor 12 is arranged a grid 18, which blocks eventual impurities blown by the hot air source 5, and improves the air temperature homogeneity by slightly congesting the incoming air. In this way, air is mixed-up and the grid 18 can even store and emit heat by itself. Alternatively, the grid mesh is so fine that grid 18 works as a filter for impurities.

Another aspect and embodiment of the present invention is defined by a thermoforming apparatus 1 for thermoforming an article 2, preferably a permeable article 2', comprising:

- an elastic membrane 3,3' connected to a tensioner 9;
- a mould 4,4';
- a hot air source 5 configured to blow a hot airflow 6 towards a zone 7 wherein the article 2,2' to be thermoformed can be arranged;
- an actuation system 8 configured to move the mould 4,4' towards the membrane 3,3' or the tensioner 9 towards the mould 4,4' so to compress the article 2,2' between the membrane 3,3' and the mould 4.

Concluding, the invention so conceived is susceptible to many modifications and variations all of which fall within the scope of the inventive concept, furthermore all features can be substituted to technically equivalent alternatives. Practically, the quantities can be varied depending on the specific technical exigencies. Finally, all features of previously described embodiments can be combined in any way, so to obtain other embodiments that are not herein described for reasons of practicality and clarity.

By way of example, the embodiments of FIG. 1 or 5 can also comprise two membranes instead of one, similarly to the embodiment of FIG. 3. These membranes can be both perforated or only that facing the hot air source can be perforated. Alternatively, the mould of the embodiments of FIG. 2 or 4 can be configured to move up and down with respect to a static membrane. In this latter case, the mould can be even arranged over the article, thus upside down with respect to the apparatus represented in FIGS. 2 and 4. Substantially, all features described in the previous paragraphs are combinable each other in several other ways for obtaining many other apparatuses which fall in the subject-matter of to the present invention, even if are not specifically represented or described for the sake of conciseness.

REFERENCE SIGNS

1 Thermoforming apparatus
2 Article
2' Permeable article
3 Elastic membrane
3' Perforated elastic membrane
4 Mould
4' Perforated mould
5 Hot air source
6 Hot airflow
6' Cold airflow
7 Zone
8 Actuation system
8' Actuator
9 Tensioner
9' Second tensioner
10 Blower
11 Heater
12 Diffusor
13 First valve
14 Discharge outlet
15 Second valve
16 Auxiliary inlet
17 Air duct
18 Filter
19 Further elastic membrane
20 Holes of elastic membrane
21 Nozzle
22 Mould-cooling circuit
23 Temperature probe
24 Recirculation system
25 Control unit
26 Laser projector
27 Moulding surface
28 Counter-mould

The invention claimed is:

1. Thermoforming apparatus for thermoforming a permeable article comprising:
- a hot air source configured to blow a hot airflow towards a zone of the apparatus configured to receive the article to be thermoformed;
- an elastic membrane that is perforated to allow passage of the hot airflow from the hot air source therethrough to said zone;
- a mould;
- an actuation system configured to move the mould towards the perforated membrane to compress the article between the membrane and the mould with a force applied by the mould on the article and with an elastic force exerted by the perforated membrane on the article.

2. Thermoforming apparatus according to claim 1, wherein the mould is perforated to facilitate the transit of the hot airflow through the zone.

3. Thermoforming apparatus according to claim 1, wherein said zone is a portion of the elastic membrane or of the mould configured to receive the article so that the article is kept between the mould and the elastic membrane.

4. Thermoforming apparatus according to claim 1, wherein the hot airflow is an airflow having a predetermined temperature.

5. Thermoforming apparatus according to claim 1, wherein the hot air source comprises a heater and a blower.

6. Thermoforming apparatus according to claim 1, wherein the mould is at least partially a positive mould.

7. Thermoforming apparatus according to claim 1, further comprising a cooling system, wherein said cooling system comprises one or more of the following options:
- a mould-cooling circuit;
- one or more nozzles configured to blow cold air towards said zone;
- a mechanism configured to deflect away the hot airflow from said zone;
- a room temperature blower.

8. Thermoforming apparatus according to claim 1, comprising at least one temperature probe and a control unit configured to control the hot air source so that the hot airflow temperature is regulated according to a temperature measured by the at least one temperature probe.

9. Thermoforming apparatus according to claim 1, comprising a recirculation system for circulating back to the hot air source the hot airflow blown over said zone.

10. Thermoforming apparatus according to claim 1, wherein said actuation system comprises an actuator, said actuator being controlled according to one or more of the following parameters: force, time, speed, movement depth.

11. Thermoforming apparatus according to claim 1, further comprising a further elastic membrane.

12. Thermoforming apparatus according to claim 1, further comprising a reference system for determining the right position of said zone wherein the article can be arranged.

13. Thermoforming apparatus according to claim 1, further comprising a tensioner configured to keep the elastic membrane tight providing a pre-tensioning of the membrane, holding the elastic membrane along its perimeter.

14. Thermoforming apparatus according to claim 13, wherein a relative displacement between the membrane and the mould is such that a moulding surface of the mould crosses the tensioner.

15. Thermoforming apparatus according to claim 1, wherein the mould is a single mould.

16. Thermoforming apparatus according to claim 1, further comprising a counter-mould.

17. Thermoforming apparatus according to claim 1, wherein the article is compressed between the membrane and the mould by uniquely moving the mould and/or the membrane by means of said actuation system without inflating or deflating the membrane.

18. Thermoforming apparatus according to claim 1, wherein the elastic membrane is entirely made of silicone or elastomer.

19. Thermoforming apparatus for thermoforming an article comprising:
- a perforated elastic membrane having a shore A grade in the range of 25 and 75;
- a mould;

a hot air source configured to blow a hot airflow towards a zone of the apparatus configured to receive the article to be thermoformed;

an actuation system configured to move the mould towards the perforated membrane or vice versa to compress the article between the perforated membrane and the mould such that the elastic force of the perforated membrane on the article forces the article to assume the shape of the mould.

20. Thermoforming apparatus for thermoforming an article comprising:

an elastic membrane comprising a plurality of pass-through perforations;

a mould;

a hot air source configured to blow a hot airflow towards a zone of the apparatus configured to receive the article to be thermoformed;

an actuation system configured to move the the membrane towards the stationary mould to compress the article between the membrane and the mould only with an elastic force of the membrane applied on the article forcing the article to assume the shape of the mould.

21. Thermoforming apparatus for thermoforming an article comprising:

a holed elastic membrane permeable to air;

a mould;

a hot air source configured to blow a hot airflow, towards a zone of the apparatus configured to receive the article, to heat the article; and, an actuation system configured to move the mould towards the holed membrane, or vice versa, to compress the article between the holed membrane and the mould;

wherein the relative displacement of the mould and the holed membrane determines an elastic reactive force of the holed membrane that, together with the compression of the mould, forces the article to assume the shape of the mould; and wherein the elasticity of the holed membrane is such that the holed membrane progressively follow the heat deformation of the heated article and simultaneously push the article against the mould.

* * * * *